United States Patent [19]

Aldridge et al.

[11] Patent Number: 5,350,205
[45] Date of Patent: Sep. 27, 1994

[54] HIGH PRESSURE GAS FITTING FOR REPEATED CONNECTION AND DISCONNECTION

[75] Inventors: Lewis L. Aldridge, Parsippany, N.J.; Kenneth W. Sawyer, Bellville, N.J.

[73] Assignee: EWAL Manufacturing Company, Inc., N.J.

[21] Appl. No.: 65,214

[22] Filed: May 20, 1993

[51] Int. Cl.⁵ .............................................. H16L 25/00
[52] U.S. Cl. .................................. 285/328; 285/354; 285/422; 285/321
[58] Field of Search ................ 285/328, 354, 422, 321

[56] References Cited

U.S. PATENT DOCUMENTS

| | | |
|---|---|---|
| 3,764,169 | 10/1973 | St. Clair . |
| 4,540,205 | 9/1985 | Watanabe et al. . |
| 4,630,636 | 12/1986 | Cutcher . |
| 4,660,868 | 4/1987 | Totani ............................ 285/328 X |
| 4,685,707 | 8/1987 | Miyashita . |
| 4,801,160 | 1/1989 | Barrington ...................... 285/354 X |
| 4,811,976 | 3/1989 | Yagisawa . |
| 4,832,376 | 5/1989 | Sugao . |
| 4,838,583 | 6/1989 | Babuda et al. ..................... 285/354 |
| 4,867,483 | 9/1989 | Witt et al. ...................... 285/354 X |
| 4,877,270 | 10/1989 | Phillips .......................... 285/354 X |
| 4,893,601 | 1/1990 | Sugao . |
| 4,900,180 | 2/1990 | Takikawa . |
| 5,060,987 | 10/1991 | Miller . |
| 5,120,084 | 6/1992 | Hashimoto . |
| 5,129,688 | 7/1992 | McGarvey ........................ 285/328 |
| 5,145,219 | 9/1992 | Babuder . |

*Primary Examiner*—Dave W. Arola
*Attorney, Agent, or Firm*—Anthony J. Casella; Gerald E. Hespos

[57] ABSTRACT

A high pressure fluid fitting is provided for repeated connection and disconnection. The fitting includes a threaded nipple and a flanged nipple configured for abutting end-to-end mating with one another. A thrust bearing formed from a metal harder than the flanged nipple is positioned adjacent the flange and on the side thereof opposite the mating face of the flanged nipple. A coupling nut with an inwardly extending annular flange is disposed over the flanged nipple and is threadedly engageable with the threaded nipple. The flange of the coupling nut moves against the thrust bearing and urges the nipples into tight sealing engagement. The smoothness and hardness and chemical dissimilarity of the thrust bearing avoid galling and other friction related damage to the fitting, and hence lead to an extended life for the fitting.

12 Claims, 3 Drawing Sheets

HIGH PRESSURE GAS FITTING FOR REPEATED CONNECTION AND DISCONNECTION

BACKGROUND OF THE INVENTION

1. Field of the Invention

The subject invention relates to fittings for high pressure and vacuum fluid lines used in environments where repeated connections and disconnections are necessary.

2. Description of the Prior Art

Gaseous fluids at pressures of 3,500 psi. and higher are used in many manufacturing processees, including the manufacture of microprocessors and other electronic components. High pressure gases also are used in various chemical engineering processes, in medical applications and in machining or welding operations. The particular gaseous fluid may vary from one industrial application to the next.

Gas for industrial applications typically is delivered to the manufacturing site in gas containers which are appropriately constructed to contain the high pressure gas therein, and which can be selectively connected and disconnected into a manufacturing system.

Purity of the specified gas often is critical to the manufacturing process. Thus, it is important for the supplier of high pressure gas to supply the gas in containers that prevent transfer leaching of contaminants from the container and/or from the attached fittings into the gas stream. It is also necessary to prevent diffusion or leakage of atmospheric contaminants through the gas delivery system and into the gas stream.

The typical prior art fitting for high pressure fluid applications includes a first generally tubular component having a fluid passage extending therethrough and having an array of external threads. A second tubular component with a fluid passage extending therethrough is dimensioned to mate in end-to-end relationship with the first component. The second component, however, generally will not include threads, but rather is provided with a pressure bearing flange or shoulder extending outwardly in proximity to the mating end. A coupling nut with an array of internal threads is dimensioned to threadedly mate with the external threads on the first tubular component of the fitting. The coupling nut further includes an inwardly extending flange dimensioned for engaging the pressure bearing flange of the second tubular component. The prior art fitting is connected by aligning the first and second components in end-to-end axial relationship to one another. The nut is then threadedly engaged with the first component. Sufficient tightening of the nut draws the abutting ends of the aligned components into tight engagement with one another.

Nonmetallic fittings and nonmetallic washers or gaskets may be employed in fittings for low pressure systems and for systems where purity of the fluid being transported is not adversely affected. However, nonmetallic fittings may not provide adequate strength for high pressure fluid applications and may permit diffusion of atmospheric moisture, oxygen and other contaminants into the high pressure gas stream. Additionally, nonmetallic washers or gaskets may wear quickly and generate wear debris which may be transported into the high purity fluid stream. Furthermore, nonmetallic fittings, especially those with a low melting point, are almost certain to fail in a fire, and hence could yield a catastrophic release of high pressure gas. Thus, fittings for high pressure, high purity fluid systems typically will avoid or minimize the use of nonmetallic materials.

Metallic fittings generally can provide a virtually leak-free connection that prevents escape of high pressure gas from the fitting and that similarly prevents diffusion of atmospheric contaminants into the gas stream, or leakage into vacuum lines. However, the forces applied between the mating surfaces of the two opposed metallic fitting components must be high and must be within certain specified range. Mating forces in a high pressure gas fitting that are too low may permit escape of the high pressure gas and/or may permit diffusion of atmospheric contaminants into the high pressure stream. Conversely, fittings that are connected with a mating force that is too high are likely to accelerate wear due to friction between the assembled components of the fitting, and may cause sealing surfaces to distort or break down after several cycles due to excessive contact pressure.

Mating pressures within a specified range typically are achieved by tightening a fitting with a torque wrench or by tightening a fitting to a specified range of motion. The torque required for proper sealing depends, in part, upon the coefficient of friction between the surfaces in the fitting that slide relative to one another. The torque required to achieve an effective seal in a high pressure, high purity fluid system can be achieved relatively easily in fittings that do not require repeated connection and disconnection. However, the unavoidable rubbing between opposed surfaces can be a significant problem in high sealing integrity systems subjected to repeated connection and disconnection. More particularly, the rubbing of unlubricated metallic surfaces over one another in high pressure fluid systems subjected to repeated connection and disconnection typically will produce wear or galling on one or both of the sliding unlubricated surfaces. This wear often causes the surfaces to become rougher, and thereby leading to an increase in the coefficient of friction. Additionally, wear debris may be generated and may ultimately enter into the fluid stream. Still further, the frictional erosion or galling of interconnected components may eventually lead to gaps between interconnected components with a corresponding leakage of the fluid. Thus, the torque required to achieve an effective seal may increase over the life of the fitting, resulting in further acceleration of wear and related problems as described above. In extreme conditions the rough tightly interconnected components of a fitting may effectively weld together in response to the heat and pressure generated during tightening.

The materials from which the prior art fitting is manufactured must be selected in accordance with their fluid capability. For example, strength in the presence of high pressure, corrosion resistance, chemical inertness, machinability and cost all are important factors. Force bearing characteristics and frictional resistance generally are of secondary consideration. Exotic alloys that meet all requirements might conceivably be available. However, these alloys are very expensive and impose a substantial cost penalty on the manufacturer.

The prior art has attempted to deal with galling by positioning ball bearings between interfaces that are likely to be subject to frictional wear. A joint with such ball bearings is shown, for example, in U.S. Pat. No. 5,118,141 which issued to Miyashita on Jun. 2, 1992. The ball bearings and accompanying races add significantly to the cost and size of the fitting and can complicate manufacturing and assembly processes. The limited load carrying capability of a ball bearing may also prevent conventional metallic seal geometry, with an adverse effect on cost and reliability.

The prior art has also attempted to use dry film lubricants, such as molybdenum disulfide, to reduce wear and control friction. However, these dry film lubricants will wear away in response to high pressure and repeated connection and disconnection. Additionally, the tiny dust-like particles which comprise the dry film lubricants create the potential for contaminating the fluid stream.

In view of the above, it is an object of the subject invention to provide a high pressure fitting with increased wear resistance and a longer life.

It is another object of the subject invention to provide a cost effective fitting for repeated connections and disconnections in a high pressure fluid system.

A further object of the subject invention is to provide a long-lasting fitting without significantly increasing the dimensions required for the fitting.

Still another object of the subject invention is to provide a high seal integrity fitting for repeated connection and disconnection without complicating the connection and disconnection procedure.

Yet another object of the subject invention is to minimize torque that could produce rotary sliding on the sealing surfaces.

SUMMARY OF THE INVENTION

The subject invention is directed to a fitting for a high pressure fluid system. The fitting comprises a first component composed with a generally cylindrical wall defining a fluid passage extending axially therethrough and an array of threads extending thereabout. The first component further includes a seat at one axially end. The first component may be a short tubular member for mating at opposed axial ends within the fitting. Alternatively, the first component may define one end of an elongate pipe or the body of a valve.

The fitting of the subject invention further includes a second component. The second component includes a generally cylindrical wall having a fluid passage extending axially therethrough. A seat is defined at one axial end of the second component. The seat of the second component is dimensioned and configured for mating with the seat of the first component in fluid tight engagement. A generally annular bearing surface is defined on the second component facing in a diametrically opposite direction from the seat of the second component. The bearing surface may be part of a bearing flange at or near the mating end of the second component. The second component may define a relatively short axial length, with appropriate connection means at its opposed axial end. Alternatively, the second component may be a unitary portion of an elongate pipe and/or may define the bonnet of a valve.

The fitting of the subject invention further includes a coupling nut having opposed axial ends and an array of threads extending from one axial end. The threads of the nut are dimensioned and pitched for threaded engagement with the threads of the first component. One axial end of the nut is dimensioned and disposed to exert forces on the bearing surface of the second component, as explained further herein.

The fitting of the subject invention further includes a thrust bearing which is a generally annular member surrounding portions of the second component and disposed intermediate the bearing surface of the second component and the flange of the nut. Thus, the thrust bearing will transmit forces between the coupling nut and the bearing surface of the second component as the nut is threadedly tightened into engagement with the first component. The thrust bearing preferably is provided with a very smooth finish. The thrust bearing, therefore, will prevent the rubbing and frictional forces from acting directly on the flange of the nut and the bearing surface of the second component. Rather, the flange of the nut will be tightened against the thrust bearing during the final stages of tightening and the beginning stages of loosening.

The thrust bearing is formed from a metallic material that is harder than the metallic material from which the nut and the second component are made. For example, the coupling nut and the first and second components all may be formed from stainless steel. However, the thrust bearing may be formed from a cobalt chromium-nickel alloy or other comparably hard material. Preferably the thrust bearing is formed from a material having a hardness (HRC) at least ten points greater than the material to be moved against the thrust bearing. The thrust bearing may also be coated with a thin layer of silver which enhances the anti-friction characteristics of the thrust bearing.

The fitting of the subject invention may further include retention means for retaining the thrust bearing on the second component and in proximity to the bearing surface. The retention means may comprise an undercut on the second component in proximity to the bearing surface and dimensioned to retain the thrust bearing. Alternatively, the second component may include an inwardly extending groove spaced from the bearing surface. A lock washer may be lockingly engaged in the groove to limit the extent of axial movement of the nut and/or the thrust bearing. Thus, the nut and thrust bearing will remain in proximity to the flange of the flanged nipple to facilitate repeated connection and disconnection.

DETAILED DESCRIPTION OF THE PREFERRED EMBODIMENT

Figure 1:
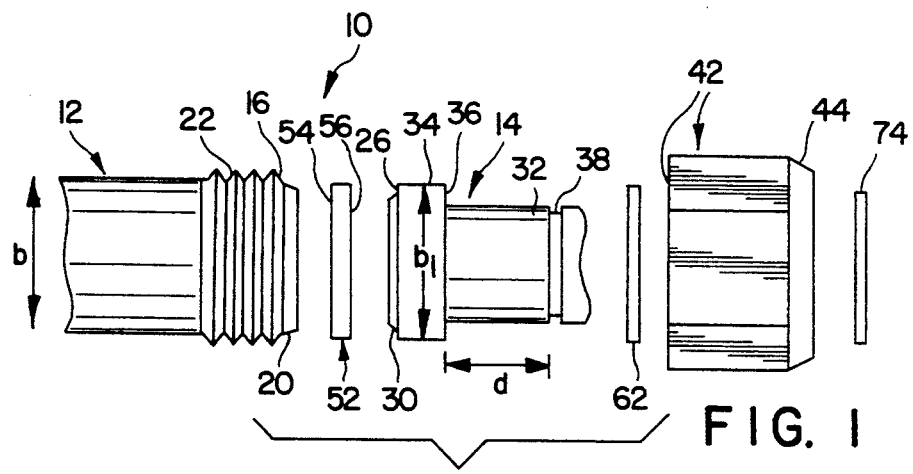
FIG. 1 is an exploded side elevational view of a fitting in accordance with the subject invention.
Figure 2:
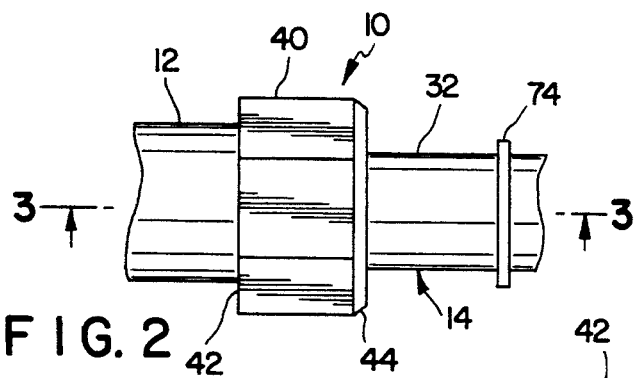
FIG. 2 is a side elevational view of the assembled fitting depicted in FIG. 1.
Figure 3:
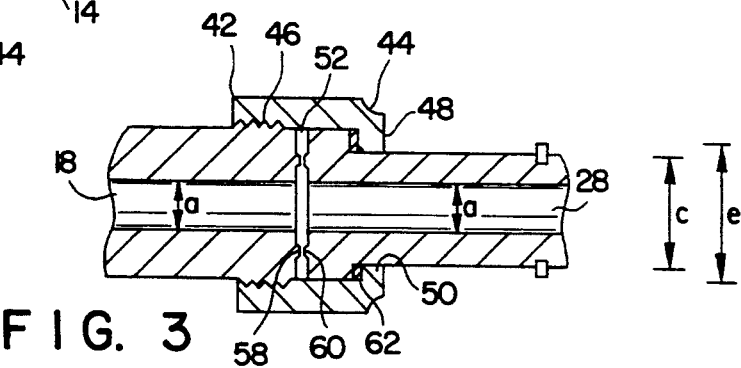
FIG. 3 is a cross-sectional view taken along line 3—3 in FIG. 2.

A fitting in accordance with the subject invention is identified generally by the numeral 10 in FIGS. 1–3. The fitting 10 is intended for high seal integrity fluid carrying systems, which typically communicate with a vacuum or carry gaseous fluid at pressures equal to or greater than 3000 psi. The fitting 10 provides a high integrity seal between a threaded nipple 12 and a flanged nipple 14. The threaded and flanged nipples 12 and 14 are shown as being axially short, but may be part of elongate sections of pipe. Alternatively, the threaded and flanged nipples 12 and 14 may be short sections which are mateable with other sections of pipe, or alternatively the nipples 12 and 14 may define portions of a valve as explained further herein.

The threaded nipple 12 is a generally cylindrical structure unitarily formed from a stainless steel, such as 316L SST. The threaded nipple 12 includes a mating end 16, an opposed end (not shown) and a cylindrical fluid-carrying passageway 18 of diameter "a" extending axially therebetween. The mating end 16 of the threaded nipple 12 is characterized by an annular sealing bead 20 which will mate with a corresponding groove on a sealing washer as explained herein. In some embodiments, the mating end of the threaded nipple 20 may be planar, while in other embodiments different sealing constructions may be provided to enhance the sealing of the fitting for a particular application. The threaded nipple 12 defines an outer circumferential surface of diameter "b". The outer circumferential surface is characterized by an array of external threads 22 disposed around the outer circumference thereof and adjacent the mating end 16.

The flanged nipple 14 also is unitarily formed from a stainless steel with strength and corrosion resistance characteristics appropriate for the fluid being conveyed through the fitting 10. Thus, for example, the flanged nipple 14 may be unitarily formed from the 316 L SST, as identified for the threaded nipple 12. The flange nipple includes a mating end 26, an opposed end (not shown) and a cylindrical fluid-carrying passageway 28 extending therebetween. The fluid passageway 28 defines an inside diameter "$a_1$" substantially equal to the inside diameter "a" of the fluid passageway 18 in the threaded nipple 12.

The mating end 26 of the flanged nipple 14 is characterized by an annular bead 30 which is substantially identical to the annular bead 20 on the threaded nipple 12. The flanged nipple 14 includes an outer circumferential surface 32 defining a diameter "c" which is less than the outside diameter "b" of the threaded nipple 12. However, the flanged nipple 14 has an outwardly extending flange 34 with an outside diameter "$b_1$" which is approximately equal to outside diameter "b" of the threaded nipple 12. The flange 34 includes a bearing surface 36 facing oppositely from the mating surface 26 of the flanged nipple 14. The flanged nipple 14 is further characterized by an inwardly extending retention groove 38 in the outer circumferential surface 32 and at a selected distance "d" from the bearing surface 36.

The fitting 10 further includes a coupling nut 40 having opposed ends 42 and 44 and an array of internal threads 46 therebetween. The threads 46 are dimensioned and pitched to threadedly engage with the external threads 22 on the threaded nipple 12. The end 44 of coupling nut 40 is characterized by an inwardly extending annular bearing flange 48 having an aperture 50 extending therethrough. The aperture 50 in the bearing flange 48 defines a diameter "e" which exceeds the outside diameter "c" defined by the cylindrical outer surface 32 of the flanged nipple 14. However, the inside diameter "e" of aperture 50 through the bearing flange 48 is less than the outside diameter "$b_1$" defined by the flange 34. Thus, the bearing flange 48 of the coupling nut 40 is dimensioned to exert axial pressure on the bearing surface 36 of flange 34, as explained further herein.

The fitting 10 further includes a generally annular metallic seal 52 disposed intermediate the sealing ends 16 and 26 of the threaded nipple 12 and the flanged nipple 14 respectively. The metallic seal 52 includes opposed sealing faces 54 and 56 which are characterized by annular undercuts 58 and 60 respectively. The annular undercuts 58 and 60 are disposed and dimensioned to engage the annular sealing beads 20 and 30 respectively on the threaded and flanged nipples 12 and 14.

Figures 4, 6:
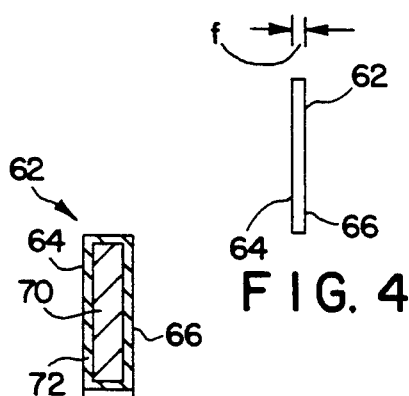
FIG. 4 is a side elevational view of the thrust bearing of the subject invention.
FIG. 6 is a cross-sectional view taken along line 6—6 in FIG. 5.
Figure 5:
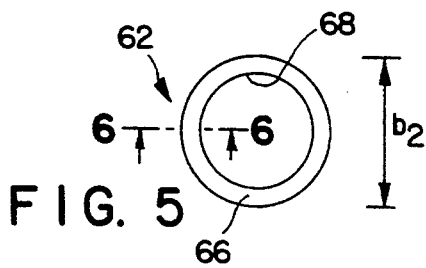
FIG. 5 is an end elevational view of the thrust bearing shown in FIG. 4.

The fitting 10 further includes a thrust bearing 62. As shown most clearly in FIGS. 4–6, the thrust bearing 62 is a flat annular member with an outside diameter "$b_2$" approximately equal to the outside diameter "$b_1$" of the flange 34 on the flanged nipple 14. The thrust bearing 62 includes opposed parallel faces 64 and 66 which are planar and very smooth and define a thickness "f" of approximately 0.005 inch. A circular aperture 68 extends centrally through the thrust bearing 62 and defines an inside diameter "$c_1$" which is slightly greater than the outside diameter of the circumferential surface 32 on the flanged nipple 14. Thus, as shown most clearly in FIG. 3, the thrust bearing 62 is mounted over the circumferential surface 32 of the flanged bearing 14, such that the planar surface 64 of the thrust bearing 62 abuts the bearing surface 36 on the flange 34 of the flanged nipple 14. The very small thickness "f" of the thrust bearing 62 result in an insignificant increase in the overall dimensions of the fitting 10.

The thrust bearing 62 is formed from a very hard (i.e. hardness HRC greater than 40) smoothly finished corrosion resistant material. Preferably, the thrust bearing 62 is formed from, or includes a substrate 70 formed from, a cobalt chromium-nickel alloy having a hardness (HRC) of 45 to 60. A preferred alloy has as its composition: cobalt—39–41%; chromium—19–21%; nickel—14–16%; manganese—1.5–2.5%; carbon 0.15 max %; beryllium 0.10 max %; and iron—balance (about 16%). An example of such an alloy is ELGILOY® which is sold by the Elgiloy L.P. Other comparably hard metallic alloys that can be polished or otherwise finished to a very smooth surface may also be employed. The roughness coefficient R.A. preferably is about 16 to 32 microinches. The substrate 70 of the thrust bearing 62 preferably is provided with a smooth thin coating 72 of silver applied thereto by, for example, flash plating. Silver has been found to exhibit desireable anti-friction characteristics when applied to the cobalt chromium-nickel substrate.

The fitting 10 further includes a snap ring 74 which is dimensioned to be snapped into the groove 38 in the outer circumference 32 of the flanged nipple 14. The snap ring 74 defines an outside diameter which is greater than the inside diameter "$c_1$" of the thrust bearing 62. The outside diameter of the snap ring 74 may also be greater than the diameter "e" of the aperture 50 through the coupling nut 40. Thus, the snap ring 74 can function to limit the range of slidable movement of both the thrust bearing 62 and the coupling nut 40 along the outer circumference 32 of the flanged bearing 14.

The fitting 10 is assembled by sliding the thrust bearing 62 axially over the outer circumference 32 of the flanged bearing 14, such that planar surface 64 of the thrust bearing 62 abuts the bearing surface 36 of the flange 34 on the flanged nipple 14. The coupling nut 40 then is slid axially over the outer circumference 32 of the flanged nipple 14, such that the inwardly extending flange 48 of the coupling nut 40 substantially abuts against the surface 66 of the thrust bearing 62. The snap ring 74 may be snapped into engagement in the groove 38 in the outer circumference 32 of the flanged nipple 14 to limit the range of slidable movement of the coupling nut 40 and the thrust bearing 62 along the flanged nipple 14. As will be explained further herein, the snap ring 74 minimizes the manipulation of components required during connection and disconnection of the fitting 10. The metallic seal 52 may be fitted adjacent the face 26 of the flanged coupling 14, such that the annular groove 60 of the metallic seal 52 engages with the annular rib 30 of the flanged nipple 14.

The threaded nipple 12 may be fitted in end-to-end abutting relationship with the metallic seal 52. The threads 46 of the coupling nut 40 may then be threadedly engaged with the threads on the threaded nipple 12. Tightening of the coupling nut 40 causes the flange 48 of the coupling nut 40 to engage tightly against the thrust bearing 62 and to urge the thrust bearing 62 tightly against the bearing surface 36 of the flange 34 on the flanged nipple 14. These forces serve to urge the flanged nipple 14 into tight sealing engagement with the threaded nipple 12.

The specified seal force is achieved typically by employing a torque wrench on the coupling nut 40. As the maximum sealing force is approached, the flange 48 of the coupling nut 40 will rub against the surface 66 of the thrust bearing 62. These rubbing forces are accompanied by significant axial force, and have the potential for generating substantial friction. However, as noted above, the substrate 70 of the thrust bearing 62 is very hard and very smooth. This permits the sliding surfaces of the thrust bearing 62 and the nut 42 to contact in a manner which allows relative motion with the load spread over as large an area as possible to minimize local contact pressure. The silver coating 72 effectively lubricates any high spots that may initially be present until the surfaces have seated. As a result, the frictional forces generated during the tightening will generate substantially no wear or other damage on the flange 48 of the coupling nut 40, the flange 34 of the flanged nipple 14 or the thrust bearing 62 disposed therebetween. The fitting 10 can be disconnected and reconnected many times without generating significant wear on any of the components. Thus, a specified amount of torque will achieve the appropriate sealing force after many cycles. The relative absence of wear avoids the generation of debris which could enter the fluid stream and further avoids the need to employ nonmetallic lubricants that could function as contaminants.

Figure 7:
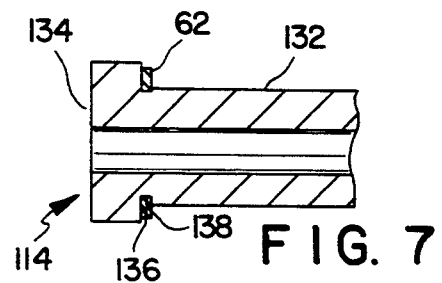
FIG. 7 is a cross-sectional view of an alternate retention of the thrust bearing on the flanged nipple.

FIG. 7 shows an alternate embodiment of the flanged nipple and assembled thrust bearing. In particular, the flanged nipple 114 in FIG. 7 includes an outer circumferential surface 132 and a flange 134 substantially as defined above. However, the outer circumferential surface 132 of the flanged nipple 114 is provided with an undercut 138 substantially adjacent to the bearing surface 136 of the flange 134. The undercut 138 is dimensioned to retain the thrust bearing 62 therein. Thus, the thrust bearing 62 can be tightly slid over the outer circumferential surface 132 and lockingly retained in the undercut 138 adjacent the flange 134. Thus, it is unnecessary to employ the snap ring as explained above, and the thrust bearing is assured of being properly and efficiently positioned for performing its intended function.

Figure 8:
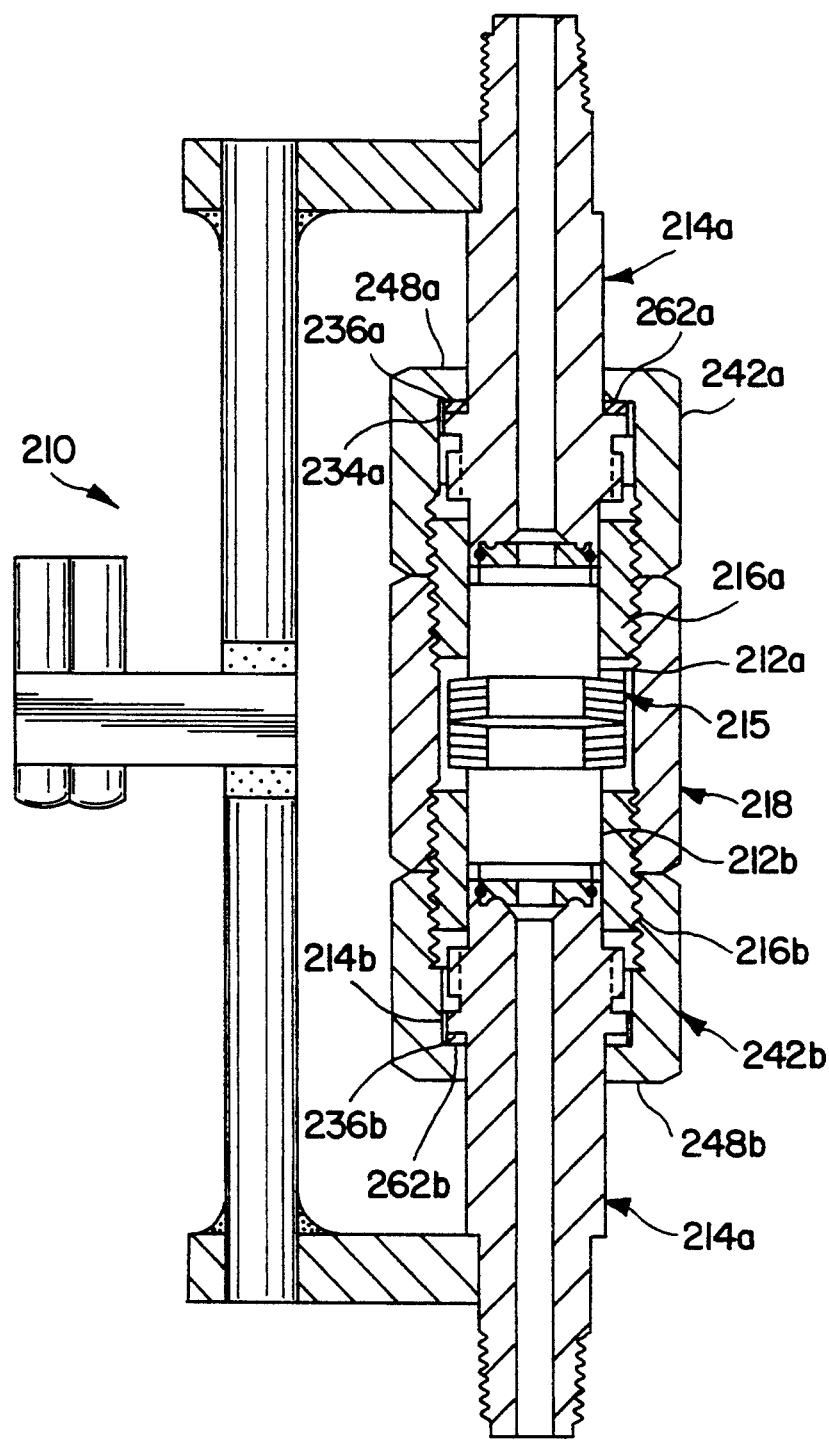
FIG. 8 is a cross-sectional view of a test fitting used for analyzing the thrust bearing.

Comparison tests were conducted to analyze the effectiveness of the thrust bearing 62 with conventional prior art fittings having no thrust bearing. For purposes of these tests, a test fixture, was designed and built to apply a constant axial load on rubbing interfaces. More particularly, a test fixture is identified by the numeral 210 in FIG. 8, and includes a pair of test nipples 212a and 212b and a pair of test flanged nipples 214a and 214b. These components are intended to be roughly comparable to the nipples 12 and 14 described above and illustrated in FIGS. 1-3. The nipples 212a and 212b are maintained in spaced relationship by a spring 215. Additionally, the nipples 212a and 212b are slidingly disposed in axial alignment with one another inside externally threaded nipples 216a and 216b. The externally threaded nipples in turn are maintained in axial alignment with one another by a connecting nipple 218.

Flanged nipples 214a and 214b are provided respectively with flanges 234a and 234b having bearing surfaces 236a and 236b. Coupling nuts 242a and 242b are threadedly engaged with the nipples 216a and 216b respectively. Coupling nuts 242a and 242b have annular bearing flanges 248a and 248b respectively. Thrust bearings 262a and 262b are disposed intermediate the bearing surfaces 236a and 236b of the flanges 234a and 234b. Thus, the annular bearing flanges 248a and 248b of the respective coupling nuts 242a and 242b will engage the thrust bearings 262a and 262b as the coupling nuts 242a and 242b are tightened. This tightening will urge the nipples 214a and 214b into tight sealing engagement with the nipples 212a and 212b, and will simultaneously cause compression of the spring 215. The spring was selected to produce the same degree of indentation in the annular metallic seals 252a and 252b as would be obtained from the first tightening of a prior art fitting.

Figure 9:
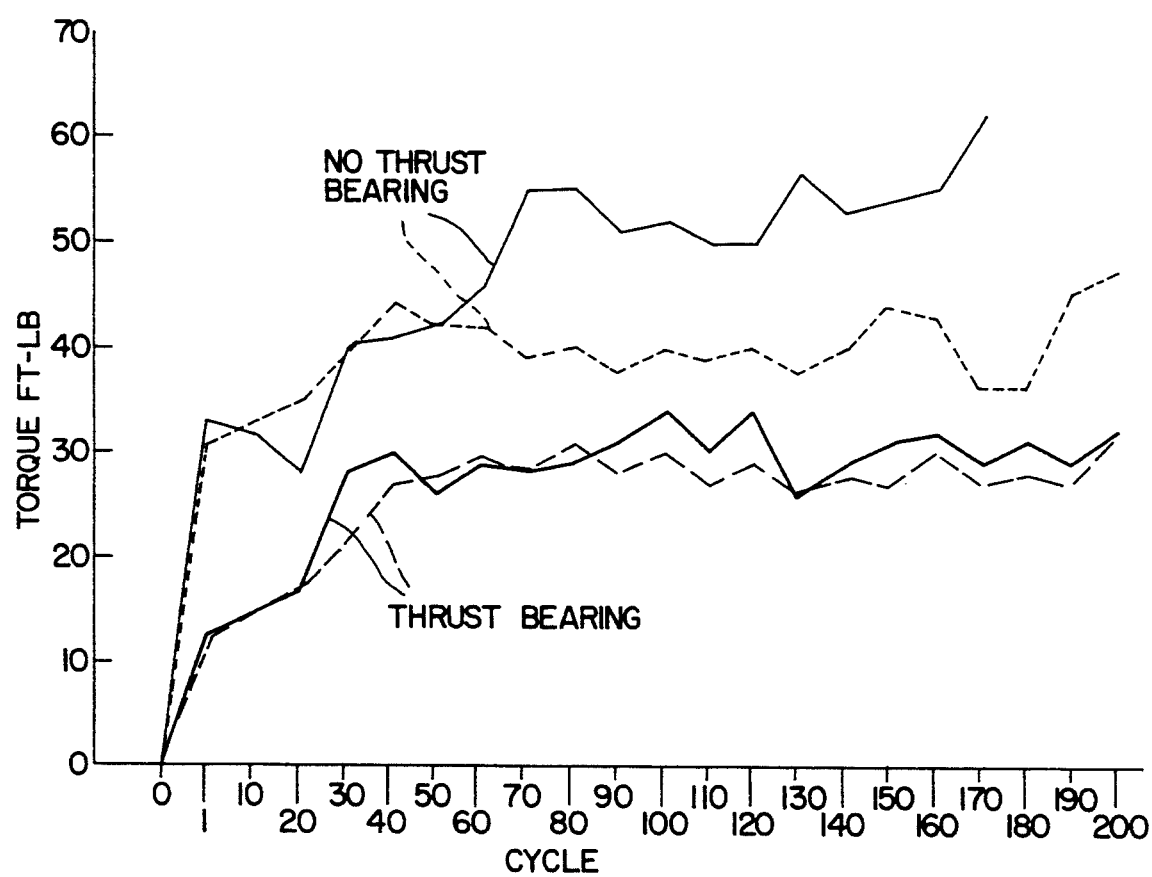
FIG. 9 is a graph of test results achieved with the test fitting of FIG. 8.

Make and break tests were carried out with the test fitting 212 both employing the thrust bearing 262a and 262b and without the thrust bearings. In these tests the torque required to simultaneously rotate the two nuts to 242a and 242b against the flanges 234a and 234b of the nipples 214a and 214b was measured, with the nipples 214a and 214b being loaded against the nuts 242a and 242b by the compressed spring 215. The analyses showed that the test fitting 210 with the thrust bearing 262a and 262b reached a value of 13-18 lb.-ft. per rubbing interface after 40 make and break cycles, and remained in that range until the termination of the test at 200 make and brake cycles. On the other hand, analyses of the test fitting 210 without the thrust bearings produced an initial torque of about 16 lb.-ft. per rubbing interface and rose to about 22 lb.-ft. after 40 cycles and continued to rise for the duration of the tests, reaching levels as high as 32 lb.-ft. per rubbing interface at only 170 make break cycles. FIG. 9 clearly shows that the thrust bearings 262a and 262b produced substantially less frictional resistance to rotation than the fitting without the bearings and that the thrust bearings 262a and 262b stabilized at a substantially and consistently lower frictional torque than was the case with test fittings without the thrust bearing. Additionally, frictional torque for the test fitting 210 after 200 make break cycles was lower than tests performed without the thrust bearing at early stages of the test.

While the invention has been described with respect to certain preferred embodiments, it is apparent that various changes can be made without departing from the scope of the invention as defined by the appended claims. For example, the nut may be externally threaded for threaded engagement with an internally threaded structure. In this embodiment, the bearing face of the nut may be at one extreme axial end. In other embodiments, the fitting into which the thrust bearing is incorporated may define a portion of a valve.

We claim:

1. A high seal integrity fluid fitting comprising:

a first member having a mating end, a fluid passage extending therethrough from the mating end and an array of threads;

an annular metallic seal releasably disposed in sealing engagement with the mating end of the first member;

a second member having a mating end releasably disposed in sealing engagement with the annular metallic seal, the second member having a fluid passage extending from the mating end thereof and communicating with the fluid passage of the first member, the second member including an annular bearing surface facing generally oppositely from the mating end of the second member, said annular bearing surface defining inside and outside diameters;

a continuous integrally formed annular thrust bearing having inside and outside diameters approximately equal to the respective inside and outside diameters of the bearing surface, said thrust bearing further having opposed parallel planar bearing surfaces, said thrust bearing defining a thickness of approximately 0.005 inch, said thrust bearing being mounted around said second member and in abutting relationship to the bearing surface thereof, the thrust bearing being formed from a material having a hardness (HRC) at lest ten points greater than the second member;

a coupling nut disposed around the mating ends of the first and second members, the coupling nut having an array of threads threadedly engaged with the threads of the first member and having a substantially planar bearing surface engaging the thrust bearing, the coupling nut being formed from a material having a hardness (HRC) at least ten points less than the thrust bearing, whereby threaded tightening of the coupling nut with the first member causes the bearing surface of the coupling nut to slidably engage the thrust bearing for urging the thrust bearing tightly into the bearing surface of the second member and for urging the mating ends of the first and second members into tight sealing engagement with said annular metallic seal.

2. A fitting as in claim 1, wherein the thrust bearing is formed from a material having a hardness (HRC) of at least 40.

3. A fitting as in claim 1, wherein the first and second members and the coupling nut are formed from stainless steel.

4. A fitting as in claim 3, wherein the thrust bearing is formed from a cobalt chromium-nickel alloy.

5. A fitting as in claim 1, wherein the mating ends of the first and second members comprise annular beads projecting therefrom, the metallic seal including annular grooves engaged with the annular beads.

6. A fitting as in claim 1 further comprising means for retaining said thrust bearing in proximity to the bearing surface of the second member.

7. A fitting as in claim 6, wherein the retaining means comprises a groove formed in said second member at a location spaced from the bearing surface, said retaining means further comprising a snap ring lockingly engaged in the groove for limiting sliding movement of the thrust bearing and the coupling nut along said second member.

8. A fitting as in claim 1, wherein the thrust bearing comprises a unitary metallic alloy substrate and a silver plating disposed on the substrate.

9. A connectable and disconnectable fitting for high seal integrity systems comprising:

a first generally tubular member having a mating end, a fluid passage extending through the first member from the mating end and an array of external threads substantially adjacent said mating end;

an annular metallic seal releasably disposed in sealing engagement with the mating end of the first member;

a second generally tubular member having a mating end disposed in sealing engagement with the annular metallic seal, a fluid passage extending from the mating end of the second member and communicating with the fluid passage of the first member, a flange extending radially outwardly from the second member and having a radially aligned annular bearing surface facing oppositely from said mating end of said second member, said annular bearing surface defining inside and outside diameters;

a continuous integrally formed annular thrust bearing mounted around said second member and having inside and outside diameters approximately equal to the respective inside and outside diameters of the bearing surface of the second member, said thrust bearing further having opposed parallel planar bearing surfaces said thrust bearings defining a thickness of approximately 0.005 inch, one said bearing surface of said thrust bearing abutting the bearing surface of the flange of the second member, said thrust bearing comprising a substrate formed from a metallic alloy having a hardness (HRC) of at least 40 and being harder than the metallic material of the second member and a plating comprising silver disposed on said substrate; and a coupling nut disposed around the mating ends of the first and second members and comprising an array of internal threads threadedly engaged with the threads of the first member and comprising an inwardly extending bearing flange releasably engaged with the other of the planar bearing surfaces of the thrust bearing, said coupling nut being formed from a metallic material less hard than the substrate of the thrust bearing, whereby threaded tightening of the coupling nut with the first member causes the flange of the coupling nut to slide against the thrust bearing and tightly urge the thrust bearing and the second member toward the first member for secure sealing engagement.

10. A fitting as in claim 9, wherein said first and second members and said coupling nut are formed from stainless steel.

11. A fitting as in claim 9 further comprising retaining means for limiting movement of said thrust bearing along said second member.

12. A fitting as in claim 11, wherein the retaining means comprises a groove formed in said second member at a location spaced from the flange thereof and a washer retained in said groove for limiting movement of said thrust bearing along said second member.

* * * * *